Nov. 15, 1927.   1,649,373
W. W. TREVOR ET AL
MACHINE FOR CUTTING TONGUES AND GROOVES IN BARREL STAVES AND THE LIKE
Filed May 22, 1924   6 Sheets-Sheet 3
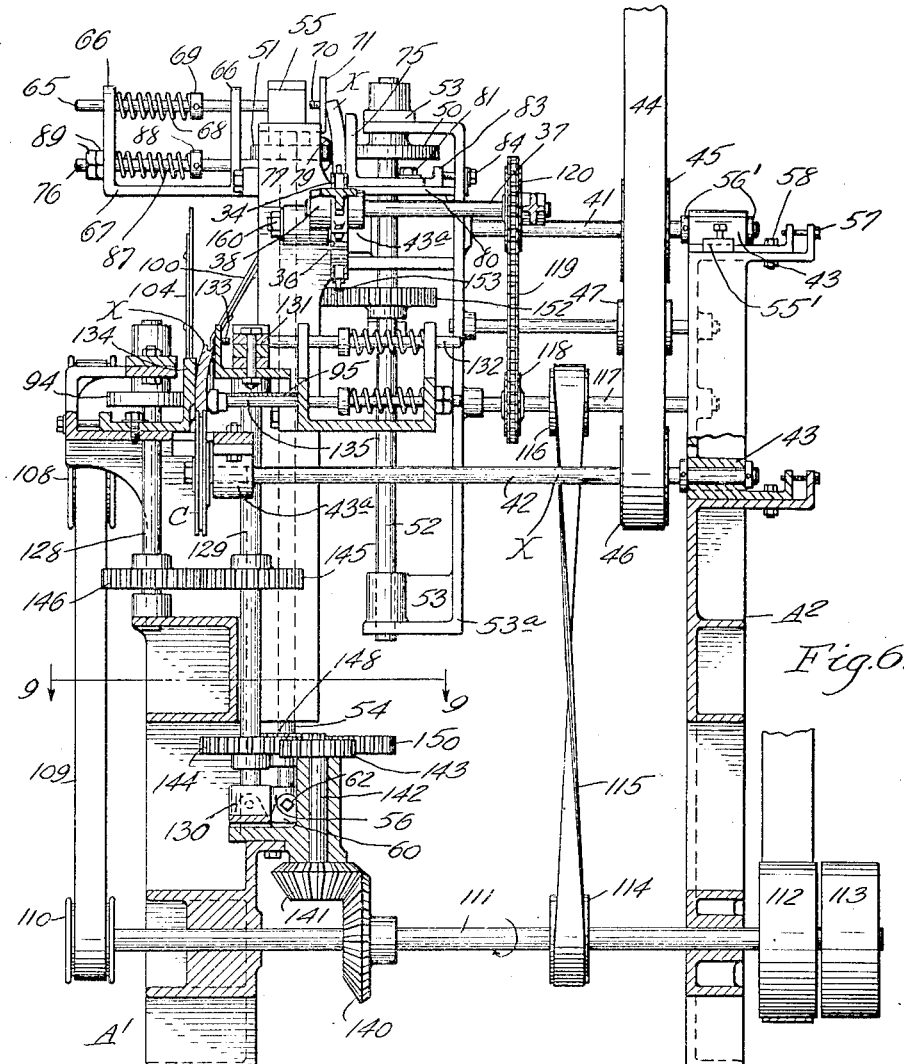
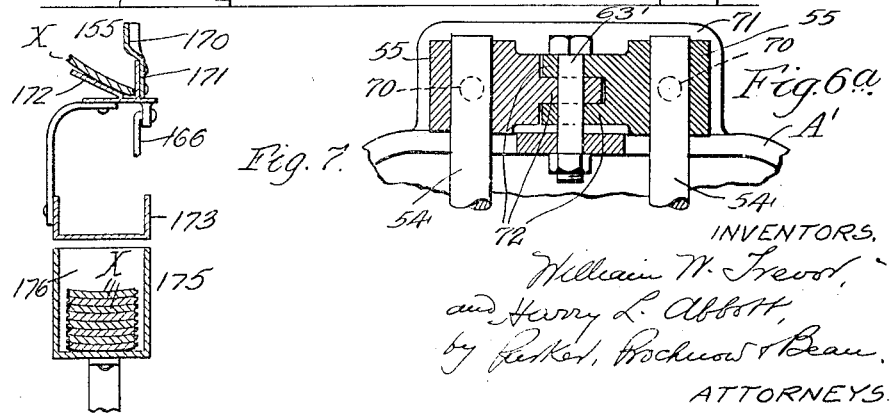
INVENTORS.
William W. Trevor,
and Harry L. Abbott,
by Parker, Brockmow & Beau.
ATTORNEYS.

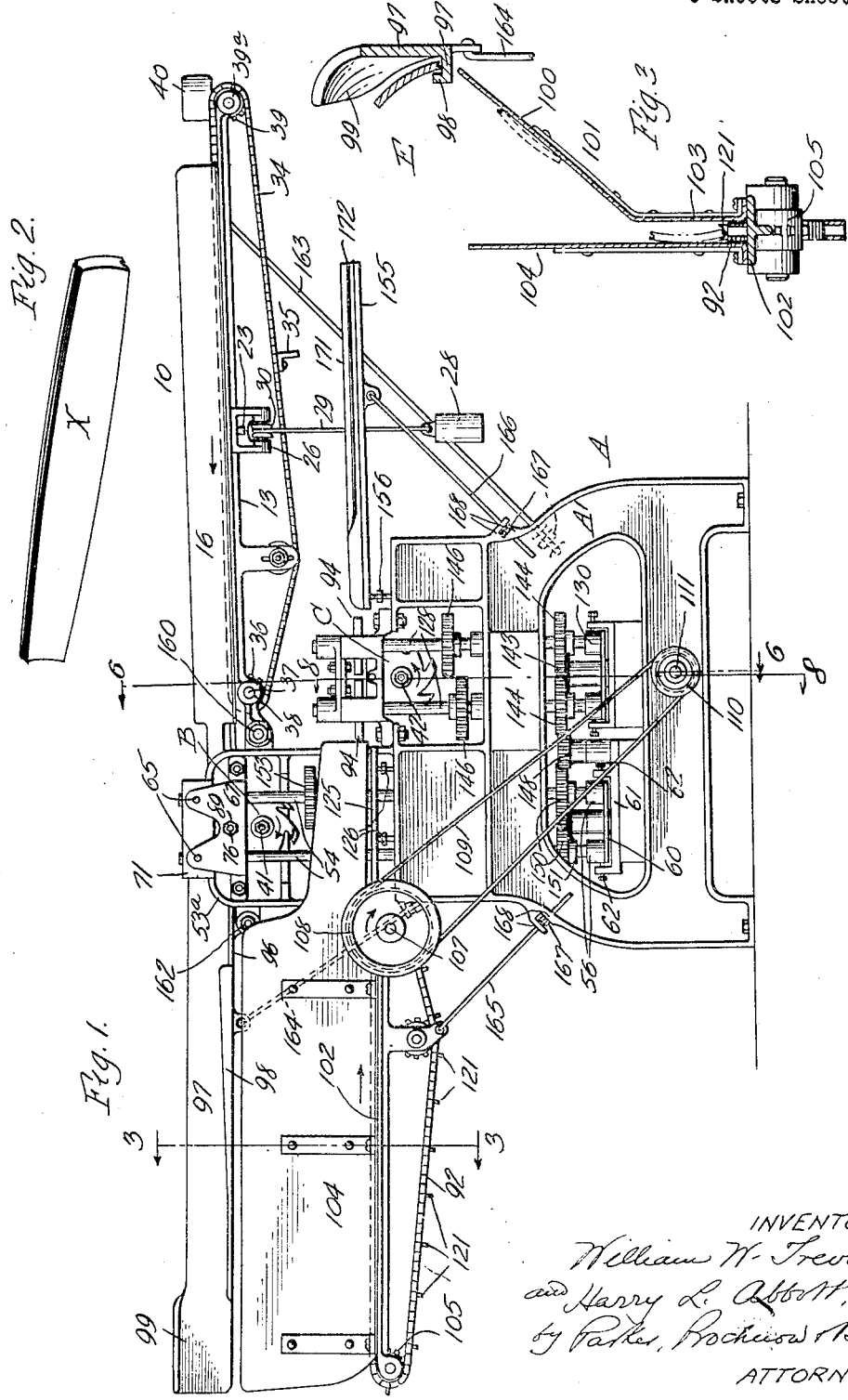

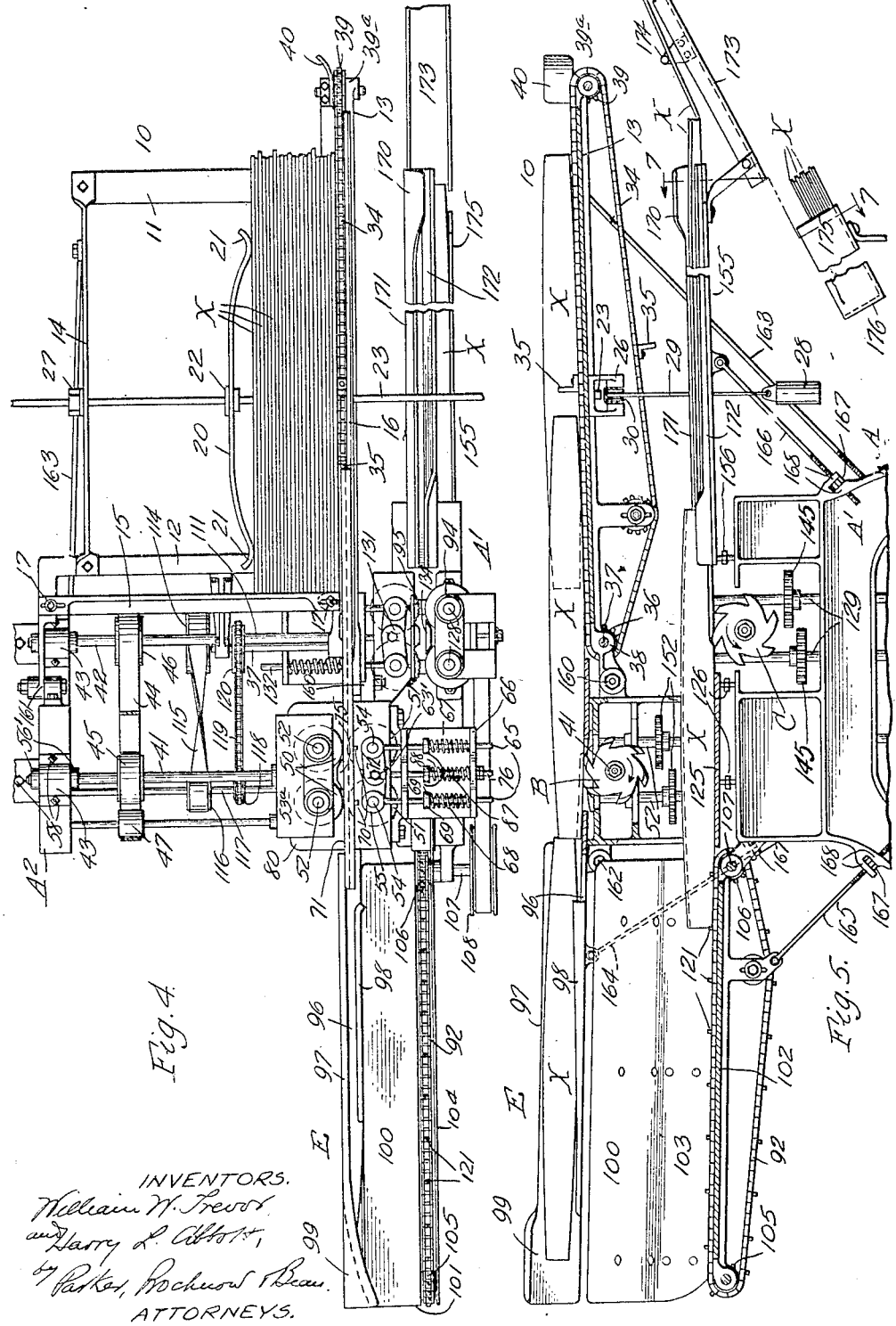

Nov. 15, 1927.  
W. W. TREVOR ET AL  
1,649,373  
MACHINE FOR CUTTING TONGUES AND GROOVES IN BARREL STAVES AND THE LIKE  
Filed May 22, 1924   6 Sheets-Sheet 4

INVENTORS.  
William W. Trevor  
and  
Harry L. Abbott,  
by Parker, Rockwood & Beau,  
ATTORNEYS.

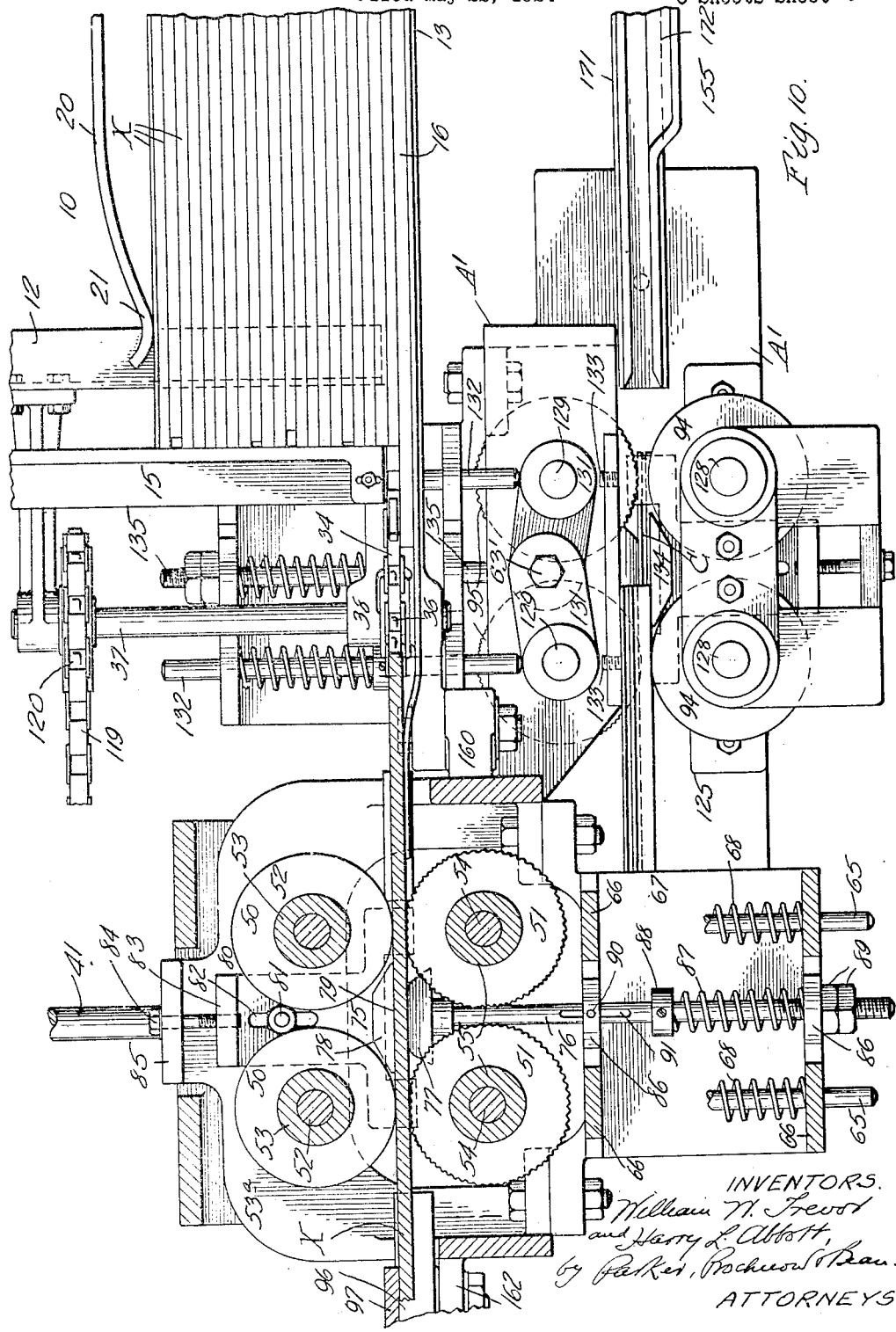

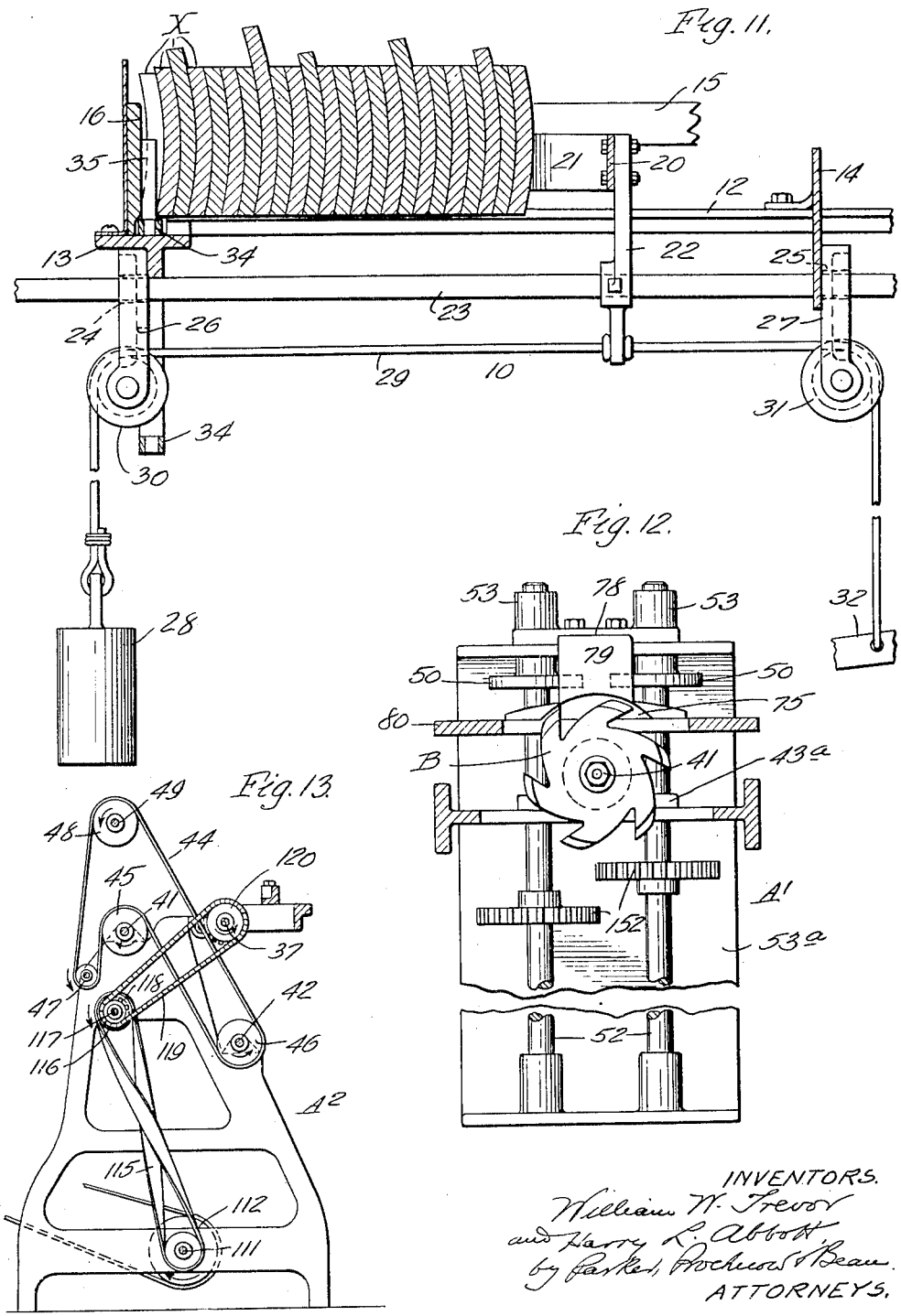

Patented Nov. 15, 1927.

1,649,373

UNITED STATES PATENT OFFICE.

WILLIAM W. TREVOR AND HARRY L. ABBOTT, OF LOCKPORT, NEW YORK, ASSIGNORS TO TREVOR MANUFACTURING COMPANY, OF LOCKPORT, NEW YORK.

MACHINE FOR CUTTING TONGUES AND GROOVES IN BARREL STAVES AND THE LIKE.

Application filed May 22, 1924. Serial No. 715,061.

This invention relates to improvements in machines for cutting tongues and grooves in the opposite edges of wood strips, especially such as barrel staves and the like which have curved or non-parallel edges. More particularly the invention relates to machines of this sort in which the staves are moved on edge in the machine so as to first present one longitudinal edge to one cutting device, and are then reversed, or turned edge for edge, so as to present the other longitudinal edge to a second cutting device.

The machines which have heretofore been provided for this purpose are relatively complicated and expensive; they are large and occupy much space, and owing to their intricate construction, require the attention of a skilled mechanic to keep them in order and to make the necessary adjustments. Furthermore, some of these machines are provided with feed rolls or devices which are intended to engage opposite faces of the staves to advance them past, and hold them in engagement with the cutters, but owing to certain mechanical defects, these feed devices do not insure the positive advance of the staves under all conditions, with the result that some staves will be jammed in the machine and prevent the proper advance of the succeeding staves. The stave reversing or inverting mechanism employed in some of these prior machines is also objectionable for the reason that a number of moving parts are required, the parts are complicated and liable to get out of adjustment and fail to function properly, owing to the fact that such mechanisms must be timed or synchronized with the feed devices on the machine, also under some conditions the moving parts engage the edges of the staves with sufficient force to break the edges and spoil the staves.

One of the objects of the present invention is to provide a machine for cutting tongues and grooves in barrel staves and the like which is of an improved construction and organization adapted to overcome the objections stated.

Another object is to provide a machine of this sort which is relatively simple and inexpensive to manufacture; occupies a relatively small space, and while being entirely automatic in action, is very simple in construction and is not liable to get out of order, while nevertheless requiring few adjustments, so that an ordinary mechanic may operate it at full capacity with little attention other than to see that the machine is supplied with staves.

Other objects are to provide a machine of this sort with an improved and simplified magazine feed mechanism which will positively feed the staves, one at a time, and on edge, to the primary cutter; also to provide improved positively driven stave gripping and feed devices for positively engaging opposite faces of the staves and feeding them to, and moving them past the cutters in proper engagement therewith; also to provide gage devices whereby the staves are gaged in relation to the cutters so that the tongues and grooves are all cut at a required predetermined distance from one face of each stave regardless of variations in the thickness of the staves, and which gage devices are further adjustable so as to be adapted to perform such gaging operations in connection with staves which are of widely different thicknesses, so that a single machine may be used to operate on many different sizes of staves.

A further object is to provide a machine of this sort in which one of the cutters and the feed means therefor are arranged above, or at a higher level than the other cutter and its feed means, and to provide improved and simplified means for reversing the staves, edge for edge, after leaving the upper cutter and, during their movement to the level of and before their endwise movement to the lower cutter, such device being constructed without moving parts.

Another object is to provide guide means for directing the inverted stave, as it leaves the inverting means and falls by gravity, so that it will be guided to and remain on edge on the feed means provided for advancing the staves to the second cutter.

Another object is to provide a machine of this sort with an improved stave discharging and stacking device.

Still other objects are to improve and simplify machines of this sort in the other respects hereinafter specified and claimed.

In the accompanying drawings:

Fig. 1 is a front elevation of a stave tongue and grooving machine embodying the invention.

Fig. 2 is a perspective view of a barrel stave having a tongue and groove produced thereby.

Fig. 3 is a transverse sectional elevation on an enlarged scale, on line 3—3, Fig. 1 of the stave reversing means.

Fig. 4 is a plan view of the machine.

Fig. 5 is a vertical longitudinal sectional elevation thereof, on the line of the upper and lower stave cutting devices.

Fig. 6 is a transverse sectional elevation thereof on an enlarged scale on line 6—6, Fig. 1.

Fig. 6ª is a detail view of an element of the machine.

Fig. 7 is a transverse sectional elevation on an enlarged scale of the stave discharging and stacking means on line 7—7, Fig. 5.

Figure 8:
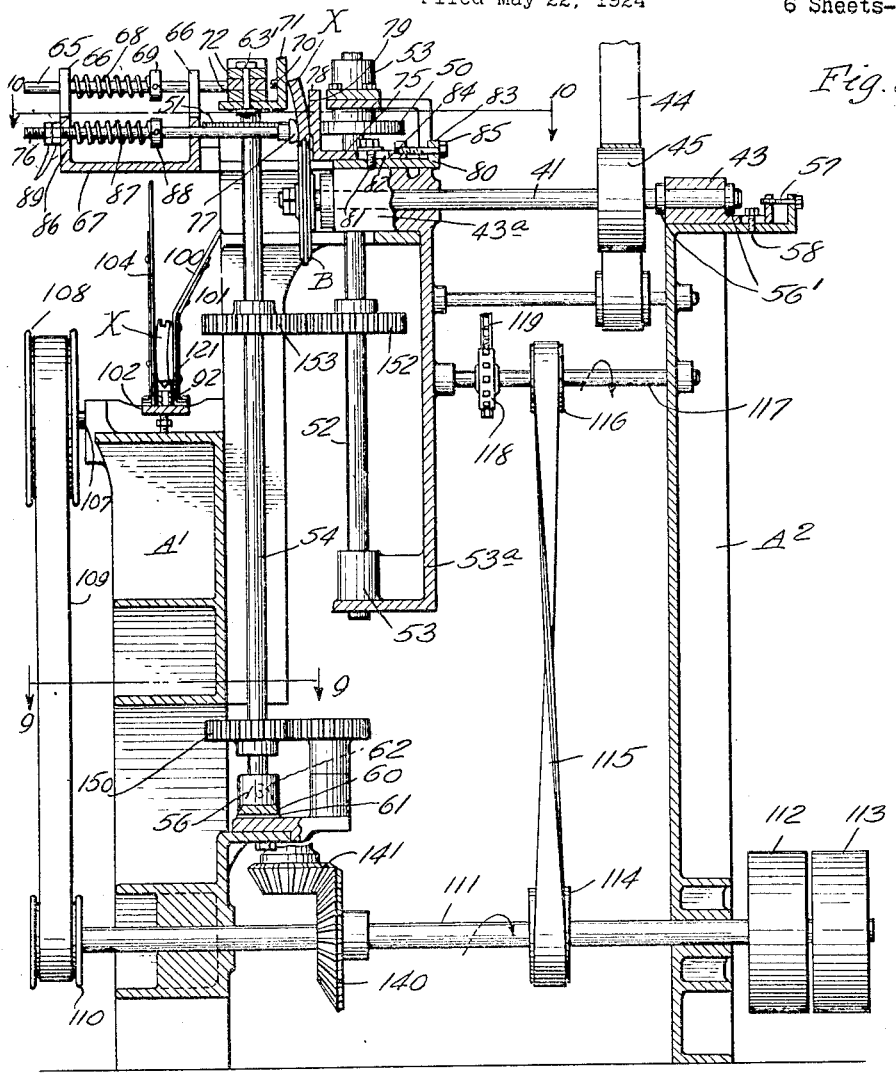

Fig. 8 is a transverse sectional elevation of the machine on line 8—8, Fig. 1, on an enlarged scale.

Figure 9:
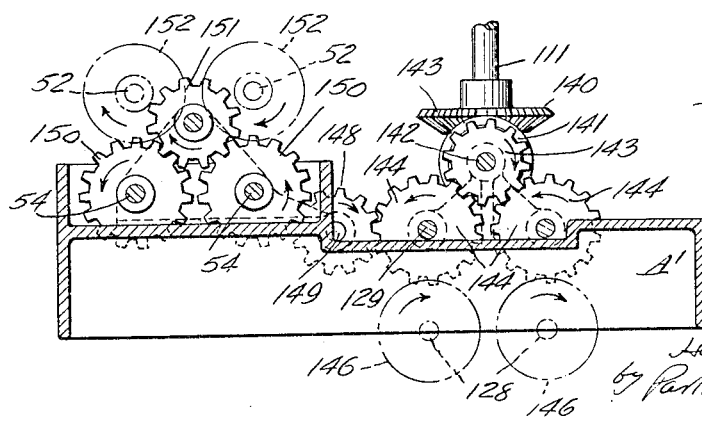

Fig. 9 is a horizontal section thereof on line 9—9, Fig. 6.

Fig. 10 is a sectional plan view, on an enlarged scale, on line 10—10, Fig. 8.

Fig. 11 is a transverse vertical section on an enlarged scale, of the magazine feed device for the staves.

Fig. 12 is a fragmentary longitudinal sectional elevation showing one of the stave cutting devices and the stave feed rolls and gage devices associated therewith.

Fig. 13 is a sectional elevation showing the drive means for the stave cutting devices and the stave feeding devices.

The machine of the present invention comprises generally, a magazine on which a number of the staves are arranged on edge, face to face; feed mechanism for feeding the staves one at a time from the magazine, a first or upper cutter for operating on the lower edges of the staves in succession; feed rolls or devices for receiving the staves from said feed mechanism and holding them in operative relation to the cutter; means for inverting the staves after they pass the upper cutter so that they may be received on a second feed mechanism which is adapted to feed the staves to a secondary or lower cutter which operates on the other edge of the stave, and lower feed rolls which in turn present the lower edges of the staves to the action of the lower or second cutter, and beyond to the discharge side of the machine, where a stacking device is preferably arranged for stacking the staves in convenient piles for their easy removal.

In the particular construction shown in the drawings a frame A is provided which comprises two parallel, spaced, upright frame members $A^1$, $A^2$ on which the various operative parts of the machine are supported. At one end of the machine (the right hand end in Figs. 1, 4 and 5) a magazine 10 for the staves is arranged in operative relation to a primary feed mechanism by which the staves are removed, one at a time, from the magazine 10 and fed endwise and on edge to the primary or upper cutter B.

The magazine 10 preferably includes a substantially horizontally arranged frame having transverse spaced bars 11, 12 and longitudinal front and rear bars or members 13, 14. The staves X are arranged on edge as shown in Figs. 4 and 11, with their convex faces turned rearwardly and their lower edges engaging the spaced bars 11, 12 near the opposite ends of the staves. The inner, or left hand ends of the staves, hereinafter called the leading ends, are adapted, when placed on the magazine, to butt against a transverse gage bar 15, while the face of the foremost stave engages a longitudinal stop plate 16, extending upwardly from the bar 13. The gage bar 15 is adjustable transversely as by the bolt and slot connections 17, so that its forward end may be moved towards and from the stop plate 16, to vary the space between the end of the bar 15 and plate 16 in accordance with staves of different thicknesses, so that, whatever may be the thickness of the staves being operated upon, the primary feed mechanism is prevented from removing more than one stave at a time from the magazine 10. 20 represents a follower or plate having curved ends 21 which are adapted to engage the rearmost stave of the stack see Figs. 4 and 11. The follower 20 is rigidly attached to a vertical supporting arm 22, adjustably secured to a transversely arranged horizontal guide rod 23 on the frame 10 and slidably arranged in holes 24, 25 formed in fixed depending front and rear brackets 26, 27 secured to the bars 13 and 14. The follower 20 is pressed against, and automatically advances the staves X through the pull exerted thereon by a weight 28 at the front of the magazine, attached by a cable or the like 29 to the lower end of the arm 22, said cable passing over sheaves 30, 31 journalled on the brackets 26, 27 respectively. If desired, a lever or device 32, of any suitable nature may be attached to the rear end of the cable 29, and preferably actuated by the foot of the operator, to retract the follower 20, against the action of the weight 28, when it is desired to place a supply of staves on the magazine.

The primary feed mechanism, in the construction shown, comprises an endless chain or the like 34, the upper run of which passes along the top face of the bar 13 towards the cutter B and extends beneath the lower edge of the front stave on the magazine. The chain is provided with a plurality of feed fingers 35, each of which, in turn, is adapted to engage the rear end of the foremost stave and remove it from the magazine and advance it towards the cutter B by moving it endwise past the gage bar 15. The fingers 35 are preferably so spaced that they are slightly farther apart than the length of the longest stave used, so the front stave of the stack will be moved out of the magazine by one finger and another stave be advanced to take its place, before another finger reaches the stave engaging position. By this arrangement the fingers do not interfere with the proper advance of the staves to feeding position. The chain is actuated by means of a sprocket 36 on a shaft 37 journalled in bearings 38 on the frame or magazine 10, and the rear end of the chain passes over a sprocket 39 journalled at 39$^a$ on the rear end of the bar 13. A curved plate or guide 40 is preferably arranged on the frame 10 adjacent this sprocket for guiding the fingers 35 into an upright position in line with the front stave, for the reason that, should a finger be tipped laterally when in stave engaging position, it would also engage the second stave at the same time, and as the leading end of this stave is in engagement with the gage bar 15, the chain would be restrained from moving, which might result in stopping the machine or breaking some part thereof.

The upper cutter B and the lower cutter C may be of any suitable kind, those shown being the well known milling type of cutters, one of which, as the cutter B, is adapted to cut a groove in one edge of each of the staves, while the cutter C is adapted to cut a tongue on the opposite edge of each of said staves. Both cutters are arranged to rotate vertically, but are disposed at different elevations and in different vertical planes. The cutters B and C are operatively arranged in any suitable manner, as by securing them on transverse horizontal shafts 41, 42, respectively which are suitably journalled in bearings 43, 43$^a$ on the frame A, Fig. 6, and are adapted to be rotated in opposite directions by suitable means, such as by a belt 44, passing over pulleys 45, 46 on the shafts 41, 42 respectively, and over an idler 47 to a drive pulley 48 on an overhead drive shaft 49, see Fig. 13. Any other suitable means may be used to impart motion to the cutters B and C.

It is desirable, in machines of this kind, to provide means for gaging, or positioning the edges of the staves relatively to the cutter or cutters so that the cuts will be formed at like distances from corresponding faces of the several staves, preferably the outer or convex faces, so that, when the staves are assembled to form a barrel, the tongues and grooves will register with each other and the outer faces of the staves will be flush, regardless of slight variations in the thickness of the individual staves. The following means of novel construction are provided for accomplishing this result.

The feed rolls for the upper cutter B are, as usual, arranged in pairs at opposite sides of the path of travel of the staves, preferably so that two rolls formed by one roll of each pair are alined with each other just in advance of the cutter and are adapted to simultaneously engage the opposite faces of a stave and withdraw it from the primary feed device and advance it over the cutter, the other roll of each pair being similarly disposed adjacent to and beyond the cutter, and are adapted to similarly engage the stave, and, in addition to holding the stave to the cutter will advance the stave to a point beyond the cutter and into operative relation to the stave reversing device to be later described. In machines having idler feed rolls at one side of the stave, the staves often stick in the machine due to imperfections on the staves which prevent the idler rolls from rotating. According to the present invention, the horizontally disposed feed rolls 50, 51 are all positively driven so that the staves will be fed over the cutter without slipping. The rolls 50 are secured to the upper ends of shafts 52 journalled in bearings 53 on a bracket 53$^a$ secured to the frame member A', and the rolls 51 are secured to shafts 54 journalled in upper and lower bearings 55, 56 respectively on the frames. The shafts 52 are rotatable on fixed axis, while the shafts 54 are tiltable and are adapted to be adjusted to move the rolls 51 toward and from the rolls 50, so as to vary the distance between the peripheries of adjacent rolls 50, 51 to permit the rolls to properly engage and feed staves of different thicknesses.

When the staves pass between the rolls 50, 51, the peripheries of the rolls 50 act as a gage to determine the position of the stave with reference to the cutter to cause the edge of the stave to be cut at the desired distance from that face of the stave which contacts with said rolls 50. Means are provided whereby an endwise adjustment may be imparted to the cutter so as to position it relatively to the rolls 50, to vary the distance of the cut from the face of the stave. In the construction shown, this is done by making the bearing 43 of the cutter shaft 41 adjustable endwise on the member A$^2$ in a slide 55' and providing said shaft with collars 56' engaging opposite ends of the bearing, so that the shaft moves endwise with the bearing and has a sliding movement in its other bearing 43$^a$. The bearing 43 may be so moved by an adjusting screw 57, and is locked in adjusted position by the set screws 58, or otherwise, see Fig. 6. The other cutter C is adjustable by similar means.

The shafts 54 for the rolls 51 are adapted to be tilted as stated, to permit movement of said rolls toward and from the rolls 50, by means of a pivoted connection between their lower bearings 56 and the supporting frame A. As shown the two bearings 56 are formed integrally with a bearing plate 60 which is disposed between a pair of fixed lugs 61 on a supporting plate on the frame A. Each of the lugs is provided with a pivot stud or bolt 62 which turns in a threaded hole in the lug, and the end of which forms a trunnion or pivot connection with the adjacent bearing 56, see Figs. 1, 6 and 8. The pivotal axis of this connection is parallel to the plane of the cutter B so that the shafts may be tilted towards and from the cutter. The upper bearings 55 for the shaft 54 are movably mounted to permit the movement of the rolls 51 toward and from the rolls 50, and are resiliently pressed towards the rolls 50 so that either or both of the rolls 51, while engaging and pressing the stave into contact with the rolls 50, may nevertheless yield to a limited extent away from these rolls to allow for variations in the thickness of the staves, or to compensate for warping or other irregularities of the surface. For this purpose, the bearings 55 are preferably pivoted at 63' and a pair of horizontal rods 65 extending transversely through lugs 66 of a bracket 67 secured on the frame member A' are pressed against the bearings 55 by coil springs 68, which surround the rods between one of the lugs 66 and adjustable collars 69 on the rods 65, thereby yieldingly pressing the bearings 55 inwardly. This movement of the bearings is limited, as by a pair of adjustable stop screws 70, extending towards the bearings from a fixed part 71 of the frame member A', so that the rolls 51 may be placed at any required distance from the opposite rolls 50. By this arrangement the rolls 51 may be adjusted towards or from the rolls 50, according to the thickness of staves in use. For example, to adjust the machine to operate on staves of greater thickness than those for which the illustrated adjustment is made, the collars 69 are loosened to permit the rods 65 to be retracted to the desired extent, so that the bearings 55 and rolls 51 may move outwardly, and then by adjusting the stop screws 70 outwardly to follow the bearings, these bearings and the rolls 51 will be yieldingly held in the adjusted position. The bearings 55 are provided with offset interfitting lugs 72 which are adapted to be pivotally connected to the frame member A' by the bolt 63'. The rolls 51, if desired may be corrugated as shown, but the rolls 50 are preferably smooth so as to avoid scoring or defacing the outer sides or faces of the staves.

The present invention includes means of novel construction for positively gaging and supporting that portion of each stave which is directly adjacent to the cutting edge of the cutters, in other words, that portion of the stave which is disposed between the first and second sets of feed rolls, and close to that edge of the stave which is being cut.

It has been found that when operating on staves that are curved in cross section and are of varying widths, the feed rolls alone cannot be depended upon to hold and feed the stave so that its lower edge will move in a straight path and be held perpendicular to the plane of the cutter and consequently the groove or tongue formed on the stave is often crooked. This also happens in the case of warped staves. The means provided to overcome these objections includes a relatively fixed gage block 75 and a yielding presser rod 76 having a stave engaging head 77. The gage block, see Figs. 8, 10 and 12 is arranged between the two rolls 50, and is provided with an upright part 78 having a flat, vertical stave engaging face 79. The gage block is adapted to be detachably secured to a rearwardly extending ledge 80 of the frame member A', as by a bolt 81 which passes through a transverse slot 82 in the block. The rear of the block has a lug 83 adapted to receive an adjusting screw 84, the head of which engages a fixed lug 85 on the ledge 80, so that by loosening the bolt 81, and turning the adjusting screw 84 the vertical face 79 of the block may be positioned in alinement with the stave engaging portions of the rolls 50. As shown in Fig. 8, the face 79 engages the rear face of the stave immediately above the cutter B, and near the lower edge of the stave, while the head 77 of the presser rod 76 engages the outer face of the stave opposite the face 79 and also near the lower edge, so that, while the stave is curved in cross section, the portion thereof adjacent the lower edge is nevertheless held substantially vertical so that the cut will be formed at a predetermined distance from the rear face of said stave. The presser rod 76 is preferably arranged to slide in guide holes in lugs 86 on the bracket 67 and is yieldingly held with the head 77 in contact with the staves by a coil spring 87 surrounding the rod 76 between one of the lugs 86 and a collar 88. The rod is adjusted, to move the head relatively to the face 79, by means of adjusting nuts 89 on the outer end of the rod, which engage the outer lug 86 and serve to limit the inward movement of the head 77. The head 77 is preferably rounded at the sides as shown, to prevent the ends of advancing staves from catching on and being retarded by it, the rod being held from turning, and thereby displacing the head, by a pin 90 and slot 91, or otherwise.

The improved stave inverting device E for turning the staves, edge for edge, after they have been advanced from the cutter B so that the opposite edge of each stave may be presented to the action of the lower cutter C, will now be described. This stave turning device E is preferably arranged to deposit the staves on a lower feed chain or the like 92, which preferably carries them in an opposite direction to their direction of travel past the upper cutter B, and presents them to the lower feed rolls 94, 95 of the cutter C, which are arranged and function in exactly the same manner as the upper feed rolls 50, 51.

The stave inverting device E includes a substantially horizontal stave support 96 disposed in line with the advancing stave as it leaves the cutter B, an upright side guide wall 97 extending along one edge of the guide and with which the back face of the stave contacts, and a relatively low edge or lip 98 spaced from the wall 97 and extending along the opposite edge of said guide and high enough only to confine the leading end of the stave between it and the wall 97 until the stave is released by the feed rolls, so as to prevent it from taking a lateral direction and prematurely leaving the support. The extreme outer end of the guide wall 97 is provided with a deflector or cam 99 formed by curving the upper and end edges of this part of the wall forwardly, see Figs. 3–5, so that the deflector extends into the path of the staves, while the support 96 and lip 98 terminate short of this deflector 99. The length of the stave support 96 is such that the longest stave operated on by the machine may be moved clear of the feed rolls 50, 51 and onto the support before the leading end engages the deflector 99, so that any one of the staves will remain on the support between the parts 97, 98, until its rear end is engaged by the next stave in its advance from the feed rolls, whereupon the leading end of the first stave will be pushed into engagement with the deflector and be tipped over the ledge or lip 98 so that its upper, uncut edge will be turned lowermost. As soon as the stave leaves the inverting device with its edges reversed as explained, the stave will gravitate towards the feed chain 92, and its concave face will engage a downwardly inclined part 100 of a plate or chute 101 which is adapted to prevent the stave from turning over too far, and is also adapted to guide the stave downwardly onto the feed chain 92 with its uncut edge resting thereon. The chain is preferably arranged with its upper run passing over a bar or support 102 at the bottom of a trough formed by the lower vertical portion 103 of the plate 100 at one side of the chain, and a vertical plate 104, being spaced relatively close together and adapted to maintain the staves on edge on the chain 102. The construction described provides a very simple stave inverting means, having no moving parts to get out of order, and the staves, as they gravitate from the support 96 are positively guided to the lower feed mechanism 92 by the guide plate 101. The feed chain 92, like the feed chain 34, passes over sprockets 105, 106, journalled at opposite ends of the bar 102, the sprocket 106 being secured to a shaft 107 and is rotated to move the upper run of the chain towards the cutter C by means of a pulley 108 on the shaft, which in turn is driven by a belt 109 from a pulley 110 on a drive shaft 111 on the frame A. This shaft is provided with tight and loose pulleys 112, 113, see Fig. 6, belted to the source of power, and the shaft 111 is also provided with a pulley 114 connected by a crossed belt 115 to a pulley 116 on a countershaft 117. A sprocket wheel 118 on the shaft 117 is, in turn, connected by a sprocket chain 119 to a sprocket 120 on the shaft 37 of the primary feed chain 34. By this arrangement the two feed chains 34 and 92 are driven from the same shaft 111, but in opposite directions.

In the particular construction shown, the feed chain 92 is provided with a plurality of relatively closely spaced feed fingers or sharp edged prongs 121, on which the staves fall from the inverting device E and which are adapted to slightly stick into the now lower edges of the staves and thus cause the staves to travel with the chain. The close spacing of the fingers insures that the staves will be moved towards the cutter C as soon as they reach the chain 92, thus preventing the possibility of a second stave being deposited on the chain before the previous stave has been discharged therefrom and is far enough to the right, see Fig. 5, to be out of the way of the next stave falling from the inverting device E to the chain. When leaving the feed chain 92, the staves, in advancing to the cutter C, pass over an adjustable support or guide plate 125 which bridges the space between said chain and said cutter, and which is preferably supported from the frame member A by the adjusting screws 126, which permit a limited vertical and tilting adjustment thereof, so that the advance ends of the staves will be properly guided to the feed rolls 94, 95.

The feed rolls 94, 95 for the cutter C, as before mentioned, operate as do the feed rolls 50, 51 for the cutter B, and are arranged respectively on shafts 128, 129. The axis of the shafts 128 are fixed, while the shafts 129 are arranged to tilt towards and from the shafts 128, to adjust the rolls 95 relatively to the rolls 94, by means of pivoted lower bearings 130, and movable upper bearings 131, which are adapted to be adjusted by the spring-pressed rods 132 and adjusting screws 133. A gage block 134 and presser rod 135 are provided for gaging and holding the lower edge of the stave in proper relation to the cutter C, these parts being arranged like the gage block and presser rod described in connection with the cutter B.

As before stated, the shafts 52, 54 and 128 and 129, for the two sets of feed rolls 50, 51, and 94, 95, are all positively driven, and any suitable means may be employed for this purpose.

The means shown in the drawings includes a bevel gear 140 secured on the shaft 111, which meshes with a bevel pinion 141 on the lower end of a short vertical shaft 142 journalled in a bearing on the frame member A', and having at its upper end a spur gear 143. This gear, in turn meshes with two gears 144, one of which is secured to the lower end of each of the shafts 129 of the feed rolls 95, see Fig. 9, while each of the shafts 128 of the other rolls 94 is simultaneously driven from the opposed shafts 129 by gears 145 on said shafts 129, above the gears 144, and which mesh with corresponding gears 146 on the shafts 128, as shown in Fig. 6. Thus the rolls 94, 95 are adapted to positively rotate to engage opposite faces of a stave and feed it continuously past the cutter C, without the possibility of the staves being retarded or becoming lodged between the rolls due to the surface imperfections or warping of the staves. The shafts 52 and 54 for the upper feed rolls 50, 51 are similarly rotated, preferably through the medium of one of the gears 144, which meshes with an idler gear 148 on a short shaft 149 journalled on the frame. The gear 148, in turn, meshes with a gear 150, on one of the shafts 54, and which meshes with an idler gear 151 adapted to mesh with a second gear 150 on the other shaft 54, thereby turning both shafts 54 in the same direction. Each shaft 52 is provided with a gear 152 which is driven from one of the shafts 54 by a gear 153. By the arrangement described, all of the feed rolls, as well as the feed chains 34 and 92, are all driven from the single drive shaft 111, and preferably the proportion of the gearing is such that the feed rolls are adapted to advance the staves at a higher speed than the feed chains, so that as soon as the advancing ends engage the feed rolls, the staves will be moved away from the fingers on the chains so as to prevent the possibility of breaking the fingers on the chains or injuring the staves.

After the staves pass the lower cutter C, they are received on a support 155, the inner end of which is adapted to be adjusted vertically by an adjusting screw 156, so that this end may be properly positioned to receive the advance ends of the staves.

In operating on barrel staves having curved edges, the curvature of the edges varies with different lengths and bilges of barrels, and in order to present the advance ends of the staves in proper relation to the cutters, the two ends or corners of each stave must be guided so that, as the advance end leaves the cutters, these ends will be gradually elevated, while the rear ends will be gradually lowered to a like degree. For this purpose the bar 13, which supports the upper run of the primary feed device or chain 34, the support 96, the support 102 on which the chain 92 runs and the support 155, are all adapted to be adjusted or tilted so that their outer ends will be elevated so that said supports and chains incline towards the cutters. Upon referring to Figs. 1 and 4, it will be seen that the magazine or frame 10, of which the bar 13 forms a part, is pivotally connected or hinged to the frame members A A' at 160, 161 while the guide 96 is similarly pivoted or hinged on the frame member A at 162, and the support 102 is conveniently hinged on the shaft 107. The parts 34, 96, 102, and 155, are respectively provided with an adjusting rod or link 163, 164, 165, 166, pivotally connected thereto outwardly beyond their hinge connections, each of said rods being adapted to be actuated to raise and lower the part to which it is connected by means of an adjusting nut 167. These nuts 167 are disposed between pairs of lugs 168 through which the threaded ends of the rods pass, so that by turning the nuts, the parts 34, 96, 102, and 155 may be tilted upwardly or downwardly, as desired. By this arrangement the parts are provided with independent adjusting means such that each part may be disposed in exactly the right position to permit the cuts to be made on the staves with great accuracy.

The staves, after they reach the support 155, are successively discharged therefrom by the engagement of their rear ends with the succeeding staves, and it is desirable that the discharged staves, instead of dropping to the floor in a disorderly pile, shall be gathered or stacked in an orderly manner so that they may be removed easily and quickly to any desired place. Means for so stacking the staves are provided, said means including a device for turning the staves flatwise before they are discharged from the support 155, and an inclined chute which receives the discharged staves and guides them into a receiving trough in such a way that the staves will be piled therein one on the other and from which they may be easily removed. As shown in the drawings, see Figs. 4, 5 and 7, the stave turning means comprises a deflector 170 at the outer end of an upright side guide 171 which extends along one edge of the support 155, and a plate or rest 172 which extends parallel with said guide and is inclined laterally and upwardly away therefrom so that its outer edge is above the support 155. The deflector is adapted to engage the advance end of each stave and tilt it so that it will fall against and rest on the plate 172, in such position that the next stave will engage it and push it flatwise from the support 155. 173 indicates the inclined chute which is preferably of trough shape and is disposed in line with the support 155 and extends upwardly with its upper end above the end of the support, and its lower end below said support. As the staves leave the support 155 they engage the bottom of the chute 173 and are moved upwardly thereon by the next stave in its advance from the cutter C, and the parts are proportioned so that, after the rear end of the leading stave is free of the support 155, the weight of the stave will cause it to disengage itself from the other stave and drop onto the bottom of the chute. To insure the proper disengagement of the stave from the stave behind it, a cross bar or finger 174 is preferably arranged to engage the upper face of the stave as it is being forced upwardly in the chute, thereby positively depressing it and freeing it from the other staves. The receiving magazine or trough 175 shown, is disposed at an inclination below and in line with the chute 173, and the staves, when they drop upon the bottom of said chute, will slide therefrom into said magazine 175 and will slide downwardly therein until arrested by the lower end wall or stop 176 thereof. By this arrangement the staves are adapted to fall one upon another in the magazine 175 in stacked arrangement such that they may be easily removed in orderly stacks or piles.

We claim as our invention:

1. In a machine of the character described, an upper cutter for cutting one edge of a stave, a lower cutter for cutting the other edge of said stave and which is arranged at a lower level than said upper cutter, a stationary support on which said stave is received on edge from said upper cutter, an upright wall on said support which maintains said stave on edge during its movement along said support, a guide rib on said support arranged to guide the stave along the support and to hold it against said wall, a stationary deflector disposed in the path of said stave and adapted to be engaged thereby to tip said stave away from said wall and over said rib to turn the stave edge for edge, during said movement, and means for receiving and advancing said reversed stave to said lower cutter.

2. In a machine for operating on staves having curved longitudinal edges, a cutter adapted to operate on an edge of said staves, means for feeding the stave on edge past said cutter, a support on which said staves are received from said cutter, said feeding means including a feed chain for moving one stave at a time towards said cutter, a magazine for receiving a plurality of staves on edge and adapted to feed the staves to said chain, and feed rolls for removing said staves from said chain and feeding them in succession past said cutter, said magazine, said feed chain and said support being pivotally mounted at their inner ends, and adjustable means for elevating their outer ends so that said devices may be inclined towards said cutter, for the purpose of guiding staves with edges of different curvatures to said cutter.

3. In a machine for operating on staves having curved longitudinal edges, a cutter adapted to operate on one edge of said staves, a second cutter adapted to operate on the other edges of said staves, means for feeding said staves one at a time on edge past said first cutter including a feed chain, a magazine for supplying staves to said feed chain, said chain being adapted to move said staves one at a time towards said first cutter, feed rolls for receiving said staves from said chain and feeding them past said cutter, a support on which said staves are received from said first cutter and means thereon for reversing said staves edge for edge, a second feed chain for receiving said reversed staves and feeding them on edge to said second cutter, a discharging support for receiving said staves therefrom, said magazine and first feed chain, said first support, said second feed chain and said discharge support being pivotally mounted at their inner ends, adjustable means for elevating their outer ends so that said devices may be inclined towards said cutters for the purpose of guiding staves with edges of different curvatures to said cutters.

4. In a machine for operating on staves having curved longitudinal edges, a cutter adapted to operate on an edge of said staves, means for feeding the staves on edge past said cutter, a support on which said staves are received from said cutter, said feeding means including a feed chain for moving one stave at a time towards said cutter, a magazine for receiving a plurality of staves on edge and adapted to feed the staves to said chain, and feed rolls for removing said staves from said chain and feeding them in succession past said cutter, said magazine having its inner end pivoted on a transverse horizontal axis, said feed chain being supported on said magazine and passing over a part thereof to engage the staves and remove them one by one from said magazine, a sprocket for actuating said chain disposed adjacent said pivotal axis and a sprocket therefor at the outer end of said magazine, adjustable means for elevating the outer end of said magazine so as to tilt it with reference to the path of movement of said staves to said cutter, said feed chain being adapted to move with said magazine, whereby its outer end is also tilted to adapt said chain for guiding staves with edges of different curvatures to said cutter.

5. In a machine for operating on staves having curved longitudinal edges, a cutter adapted to operate on an edge of said staves, means for feeding the staves on edge past said cutter, a support on which said staves are received from said cutter, said feeding means including a magazine for receiving a plurality of staves on edge and adapted to feed said staves endwise therefrom one by one, a feed chain adapted to engage said staves as they leave said magazine and feed them endwise therefrom towards said cutter, feed rolls for receiving said staves from said chain and feeding them past said cutter, a transverse horizontal pivot which is common to said magazine and to said chain and is disposed adjacent their inner ends, adjustable means for elevating the outer ends of said magazine and said chain, whereby the stave engaging run of said chain is inclined downwardly toward said cutter for guiding staves with edges of different curvatures to said cutter.

6. In a machine of the character described, the combination of an upper cutter for cutting one edge of a stave, a lower cutter for cutting the other edge of said stave and which is arranged at a lower level than said upper cutter, a support on which said stave is received from said upper cutter, a stationary deflector adapted to be engaged by said stave in its movement along said support and which is adapted to tip said stave off of said support and cause it to fall therefrom and turn edge for edge, a stationary guide below said support with which said stave engages as it leaves said support, a movable feed device at the bottom of said guide upon which the stave is directed edgewise by said guide, a trough having sides extending along opposite sides of said feed device and adapted to maintain said reversed stave in edgewise position on said feed device, and said feed device being alined with and adapted to advance said stave to said lower cutter.

WILLIAM W. TREVOR.
HARRY L. ABBOTT.